Oct. 31, 1933.  J. SNEED  1,933,079
BRAKE
Filed Sept. 15, 1928  2 Sheets-Sheet 2

John Sneed, Inventor

Attorneys

Patented Oct. 31, 1933

1,933,079

UNITED STATES PATENT OFFICE 1,933,079

BRAKE

John Sneed, Ferndale, Mich., assignor to the Midland Steel Products Company, Cleveland, Ohio, a corporation of Ohio Application September 15, 1928
Serial No. 306,174

26 Claims. (Cl. 188—78)

This invention relates to brakes and more particularly to an improved brake of the auxiliary servo shoe type.

In my copending application, Serial No. 223,020, filed September 30th, 1927, I have shown a brake of similar general characteristics wherein the auxiliary shoe moves radially to engage the cylindrical part of the brake drum. I have found that in the operation of brakes generally, there is distortion of the cylindrical flange of the brake drum and in brakes of the auxiliary servo shoe type, this distortion often results in decreasing the diameter of the drum flange adjacent the auxiliary servo shoe with the result that the brake may tend to grab during its operation. I have discovered and illustrated herewith as part of my present invention, that if the auxiliary servo shoe is arranged to act upon the radial face of the drum, which is not subject to distortion, that the grabbing effect, due to drum distortion, is eliminated, and that the other benefits of the auxiliary servo shoe type of brake may be retained and enlarged upon.

It is among the objects of my invention to arrange a brake comprising essentially a servo shoe and a served shoe in which the servo shoe engages a moving surface not engaged or distorted by the main or served shoe. Another object is to provide a brake wherein at least one of the shoes or friction elements has substantially 360° of drum engaging surface, along with a servo shoe, which acts to force the first shoe into engagement with the drum.

Other objects include the arrangement of retractor springs for centering and holding the shoes out of contact with the drum when the brake is idle. Further objects include constructing the shoes so that they may overlap without being wasteful of space within the brake drum. Another object is to arrange simple actuating means for causing engagement between the friction elements and the brake drum.

Other objects will appear from the following description of a preferred form of my invention, reference being had to the accompanying drawings. The essential characteristics are summarized in the claims.

Figure 1:
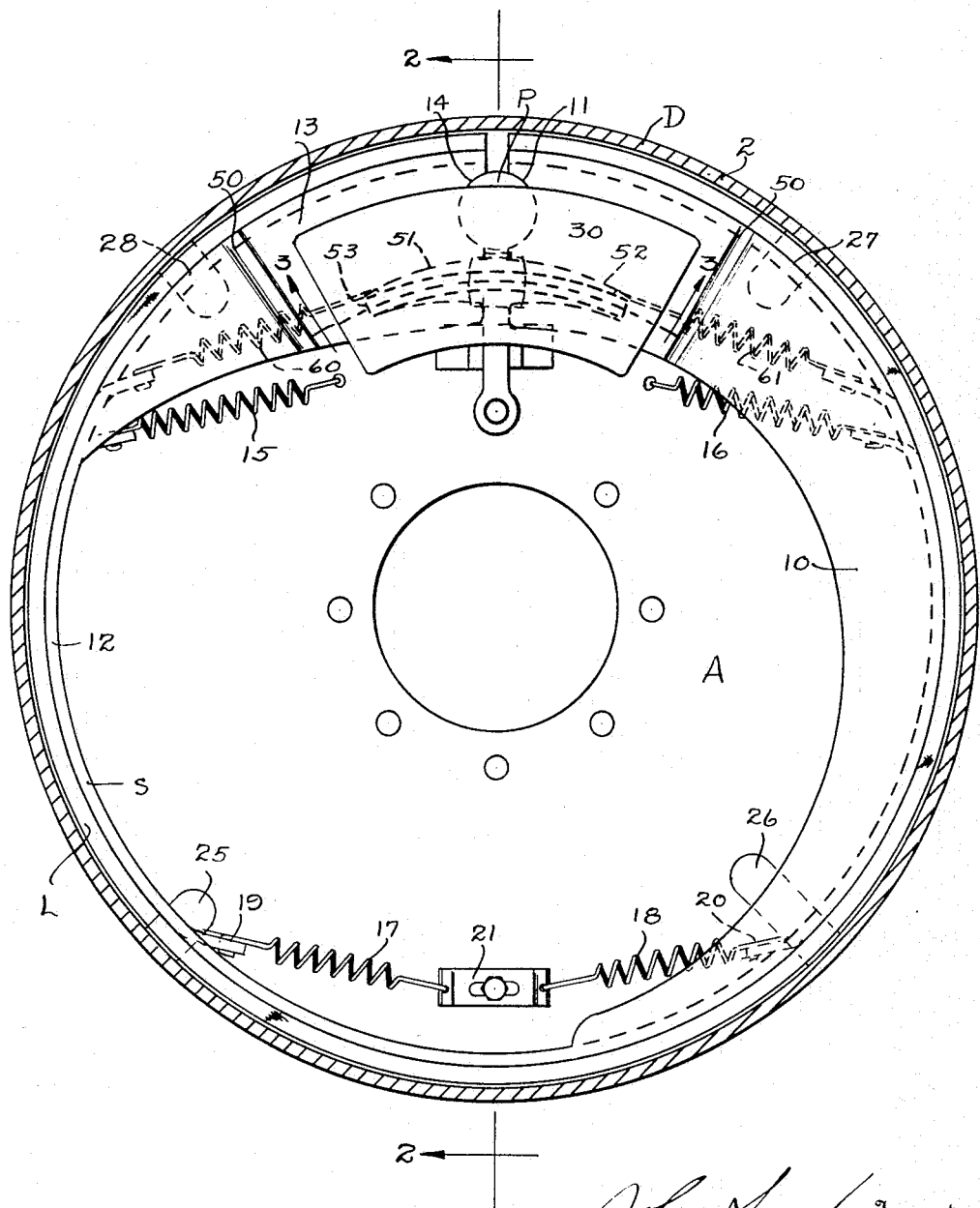
Figure 2:
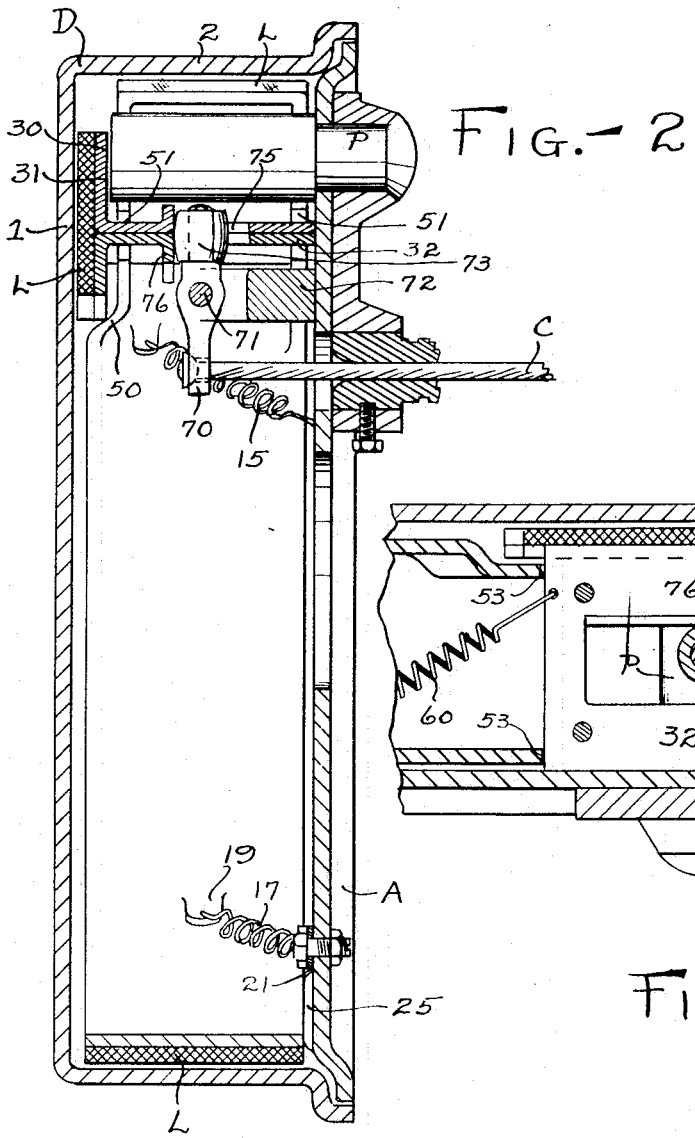
Figure 3:
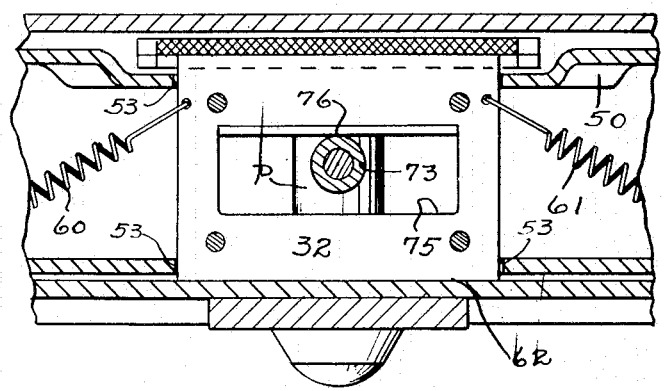

In the drawings, Fig. 1 is an elevation of the shoe assembly; Fig. 2 is a section taken along the lines 2—2 of Fig. 1; and Fig. 3 is a section taken along the lines 3—3 of Fig. 1.

Referring to the drawings, I illustrate my brake with the usual brake drum D and backing plate or apron A. The drum, as is the usual practice, consists of a disc-like part 1 and a cylindrical flange 2. Carried by the apron is an anchor pin P through which the braking torque is taken. My brake comprises essentially a main shoe S having suitable brake lining L which acts in the usual manner to engage the cylindrical part 2 of the brake drum. The shoe may comprise a relatively rigid channel part 10 having inwardly extending side flanges which are notched at one end to engage the anchor pin P as at 11. The shoe may also comprise an integrally extending flexible part 12, one end of which may be channeled in cross section as at 13 with arcuate anchor engaging surfaces 14. The shoe is arranged in the drum so that during the usual forward motion of the vehicle when the drum rotation is counter clockwise, as viewed in Fig. 1, the more flexible part of the shoe tends to serve the more rigid part, and the braking torque is imposed upon the anchor through the relatively rigid part 10 of the shoe via the anchor engaging surfaces 11. It will be noted, however, that the shoe is also effective when the drum is rotating clockwise, when the more rigid part of the shoe tends to serve the more flexible part.

Retractor springs 15 and 16 urge the ends of the main shoe S upon the anchor when the brake is idle and also tend to draw the shoe toward the apron and hold it there against rattling. Opposite the anchor, a spring centering device is provided for the mid portion of the shoe, similar in principle, to that illustrated in my copending application mentioned above, and described in detail in my copending application Serial No. 281,062, filed May 28th, 1928. For the sake of the present description, it will suffice to say that the centering device comprises springs 17 and 18 secured at their far ends to the shoe as at 19 and 20, and secured at their near ends to a piece 21 which is adjustably secured on the apron. Springs 17 and 18 center the mid portion of the shoe S circumferentially of the drum and also tend to draw it toward the apron to hold it against rattling. Portions of the apron are raised slightly as at 25, 26, 27 and 28 to provide substantial point contact for spacing the shoe from the body of the apron.

As mentioned above, my invention includes the auxiliary servo shoe 30 having suitable brake lining L which acts against the radial or disc-like part 1 of the drum. The auxiliary shoe 30 may be substantially T-shaped in section having a lining supporting part 31 and inwardly extending body parts 32. The shoe may be made essentially of curved angles arranged back to back and secured together to give the T-section.

The lining supporting part of the shoe 30 may overlie the end of the anchor pin P and lie adjacent the ends of the main shoe S. The side flanges of the ends of the main shoe S may be inturned as at 50 to provide space for the auxiliary shoe.

The ends of the side flanges of the main shoe are slotted as at 51 and 52 to receive the inwardly extending part 32 of the auxiliary shoe. In operation, the auxiliary shoe 1 is forced to the left, as viewed in Fig. 2, into contact with the radial face of the drum and is urged by frictional engagement in the direction of drum rotation. If the drum be moving counter clockwise, as viewed in Fig. 1, the auxiliary shoe will be carried to the left and will move the end 13 of the main shoe to the left and into engagement with the cylindrical drum flange. The inwardly extending part 32 of the auxiliary shoe will engage the bottoms of the slots 51 in the side flanges of the channel of the end 13 of the shoe, as at 52, see also Fig. 3. It will be appreciated that when the drum rotation is clockwise, that the action of the auxiliary shoe will be in the opposite direction with a similar effect. As viewed in Fig. 1, it will be seen that the slots 51 and 52 do not closely fit the inwardly extending part 32 of the auxiliary shoe for the reason that as the brake is applied, the anchored end of the shoe swings about the anchor while the unanchored end of the shoe is moved bodily away from the anchor on a line more or less parallel with a tangent to the drum near the anchor.

When the auxiliary shoe is relieved from contact with the radial face of the drum, one or the other of the retractor springs 15 or 16 urge the freely acting end of the shoe back upon the anchor and additional retractor springs 60 and 61, which act between the auxiliary shoe and the ends of the main shoe, center the auxiliary shoe and draw it back toward the apron and out of contact with the drum. In the embodiment of my invention described herewith, I prefer that the springs 60 and 61 be lighter than the springs 15 and 16 and that the inwardly extending part 32 of the auxiliary shoe is drawn back into contact with the apron, as at 62, see Fig. 3, and held there against rattling.

Actuation of the brake is effected through a cable C or similar suitable means which are attached within the drum to a radially extending lever 70, which is pivoted at 71 in a bracket 72 secured to the apron. The upper end of the lever 70 carries a barrel shaped roller 73 which projects through an aperture 75 in the inwardly extending body part of the shoe and contacts with flanged parts 76, which are turned out to offer a large bearing surface to the roller 73. In operation, tension on the cable turns the lever 70 counter clockwise, as viewed in Fig. 2, and exerts a pressure forcing the auxiliary shoe into contact with the radial face of the drum. When tension on the cable is relieved, the lever is moved clockwise, as viewed in Fig. 2, by reason of the tension of the springs 15 and 16 and 60 and 61, and the cable is drawn back into the drum until the parts assume the idle position illustrated in the drawings.

While the foregoing is a description of the preferred form of my invention, modifications within its scope will occur to those skilled in the art, and I do not care to be limited to the specific details or in any manner other than by the claims appended hereto.

I claim:—

1. In a brake, the combination of an apron, a drum, a main shoe engageable with the drum flange, an auxiliary shoe acting upon the main shoe and engageable with the radial face of the drum, means pivotally supported on said apron for moving the auxiliary shoe axially into engagement with the said radial face of the drum, and resilient means extending between the main and auxiliary shoes for drawing said auxiliary shoe out of contact with the drum and toward said apron.

2. A brake comprising a rotating drum a fixed part, a main shoe engageable with the drum, an auxiliary shoe engageable with the main shoe and acting upon the radial face of the drum, a lever pivotally mounted on the fixed part to swing in a radial plane and having a roller contacting with the auxiliary shoe whereby movement of the lever moves the auxiliary shoe into engagement with the drum whilst rolling contact exists between the lever and the shoe, and means attached to the lever, the connection being made within the drum, for moving said lever.

3. A brake comprising a revoluble drum, a fixed apron, an anchor carried by the apron, a full floating shoe having adjacent ends engaging said anchor, the ends of the shoe being reduced in width to a lesser width than the body of the shoe, an auxiliary shoe positioned beside the reduced ends of the main shoe adjacent the anchor and movable axially of the drum into engagement therewith.

4. A brake comprising a revoluble drum, a fixed apron, an anchor carried by the apron, a full floating shoe having adjacent ends engaging said anchor, the ends of the shoe being reduced in width to a lesser width than the body of the shoe, an auxiliary shoe positioned beside the reduced ends of the main shoe adjacent the anchor and movable axially of the drum into engagement therewith, and means for moving the said auxiliary shoe into engagement with the drum including a part having rolling contact with the auxiliary shoe for forcing it axially while the shoe moves relative to said anchor.

5. A brake having an anchor, an auxiliary shoe, a main shoe having channel parts at least at its ends with inwardly extending side flanges, the ends of the side flanges being notched to engage the anchor and the ends of the side flanges also being notched to receive a part of said auxiliary shoe.

6. A brake having an anchor, an auxiliary shoe positioned laterally adjacent the anchor, a main shoe having channel parts at least at its ends with inwardly extending side flanges and being reduced in width at its ends, adjacent the auxiliary shoe the ends of the side flanges being notched to engage the anchor and the ends of the side flanges also being notched to receive a part of said auxiliary shoe.

7. In a brake, the combination of a drum with a cylindrical flange, an apron closing the open face of the drum, an anchor carried by said apron, friction means having a free end retractable onto said anchor, an auxiliary shoe axially movable into engagement with radial face of the drum and engageable with the free end of said friction means, said auxiliary shoe having a part lying below the anchor and engaging the apron in idle position and having an elongated opening therein, and a lever pivotally mounted on the apron and having one end extending into said opening and engaging said auxiliary shoe for forcing it into engagement with said drum.

8. A brake comprising a revoluble drum, a fixed part including anchoring means, a main shoe anchorable upon said means and having at least one free end movable into engagement with said drum, said free end being reduced to a lesser width than the body of the shoe, and an auxiliary shoe positioned beside the reduced end of said first named shoe and movable axially of the drum into engagement therewith.

9. A brake according to claim 8 wherein one of said shoes has a radially extending part engageable with an axially extending part of the other shoe through which force is transmitted from one shoe to the other.

10. A brake according to claim 8 wherein said main shoe has an inwardly extending radial reinforcing flange formed with a circumferentially extending notch, and wherein said auxiliary shoe has an axially extending part lying in said notch and engageable with the base thereof.

11. A brake according to claim 8 wherein said main shoe end has a radially inwardly extending reinforcing flange notched to receive said anchoring means and notched to receive said auxiliary shoe and wherein said auxiliary shoe has an axially extending part extending through said last named notch and resting upon said fixed part at least when the brake is idle.

12. A brake according to claim 8 wherein said auxiliary shoe has an axially extending part extending transversely of said main shoe and toward said fixed part in combination with actuating means associated with said fixed part and engageable with the said axially extending part of said auxiliary shoe.

13. In a brake, the combination of a drum with a cylindrical flange, an apron closing the open face of the drum, friction means having at least a free end movable into engagement with said cylindrical drum flange, an auxiliary shoe engageable with at least the free end of said friction means and movable axially into engagement with the radial face of the drum, said auxiliary shoe having an axially extending part lying normal to said apron and having an elongated opening therein, and means for moving said auxiliary shoe into engagement with said drum including a lever pivotally mounted on said apron and having a part extending into said opening and engaging said auxiliary shoe.

14. A brake according to claim 13 wherein a roller is carried by the end of said lever within said opening and engages said auxiliary shoe whereby said shoe may freely move circumferentially relative to said lever while thrust is being transmitted from the lever to the auxiliary shoe via said roller.

15. A brake according to claim 13 wherein the stock of the axially extending part of the auxiliary shoe is turned at right angles adjacent the opening therein to provide a wearing surface for said lever.

16. A brake according to claim 13 wherein said auxiliary shoe is formed to two L sections back to back with the stock adjacent at least one side of said opening turned oppositely at right angles to the plane of said opening to provide an enlarged wearing surface for engagement with said lever.

17. A brake comprising a rotatable drum, a friction device having adjacent separable ends expansible into engagement with said drum, an auxiliary shoe engageable with said drum, and positioned between and engageable with either of said ends according to the direction of drum rotation to force one of said ends away from the other, said auxiliary shoe being carried by and supported by said ends, and means for moving said auxiliary shoe axially into engagement with said drum.

18. In a brake, the combination of a rotatable drum, a friction device having adjacent separable ends, an auxiliary shoe independently engageable with said drum and carried by said ends and resiliently connected thereto and engageable with either of said ends to move it into engagement with said drum and means for axially moving said auxiliary shoe.

19. In a brake, the combination of a rotatable drum, a fixed part, an anchor carried by the fixed part, a full floating main shoe having adjacent ends engageable with said anchor and resting thereon at least in idle position, an auxiliary shoe positioned adjacent said anchor and engaged and supported by the ends of said main shoe and means for axially moving said auxiliary shoe relative to the brake drum whereby it carries one or the other of said ends away from said anchor according to the direction of drum rotation.

20. In a brake, the combination of a rotatable drum, a friction device having adjacent separable ends and having a lining supporting portion and at least one radial rib, a portion of said rib being axially spaced from the remainder, an auxiliary shoe independently engageable with said drum and carried by said axially spaced portion and resiliently connected thereto and engageable with either of said ends to move it into engagement with said drum and means for axially moving said auxiliary shoe.

21. In a brake, the combination of a rotatable drum, a fixed part, an anchor carried by the fixed part, a full floating main shoe having adjacent ends engageable with said anchor and resting thereon at least in idle position, said shoe having an axial flange, an auxiliary shoe positioned adjacent said anchor and engaged and supported by the flange of said main shoe and means for axially moving said auxiliary shoe relative to the brake drum whereby it carries one or the other of said ends away from said anchor according to the direction of drum rotation.

22. In combination, a brake drum, a brake shoe formed as an annulus having separable ends and a lining supporting portion and a radial rib, said radial rib having a portion thereof offset axially, an auxiliary shoe engaged and supported by said offset portion of said radial rib, means for moving said auxiliary shoe relative to the brake drum whereby it carries one or the other of said ends into contact with the drum, said means including a lever and a flexible tension member, said tension member being connected to said lever within said drum.

23. In a brake, the combination of a split brake shoe having a lining supporting surface and a radial rib, said radial rib extending over substantially one-half of the circumference of said brake shoe to thereby provide a rigid side at one end of the band and a flexible side at the opposite end of the band, and means for spreading said shoe comprising an auxiliary shoe working circumferentially between the ends of the main shoe when in contact with said brake drum, said shoe working against a relatively rigid side of the shoe when moved in one direction and against a relatively flexible side of the shoe when moved in the other direction.

24. The combination of a brake shoe having a lining supporting portion and a reinforcing rib cut away for substantially one-half of the circumference to provide the shoe with a flexible side at one end and a less flexible side at the opposite end of the band and an auxiliary shoe for operating said shoe, said auxiliary shoe acting against a flexible side of said brake shoe when moved in one direction and against a side having a lesser degree of flexibility when moved in the other direction.

25. A brake comprising a revoluble drum, a common anchor, a main one piece shoe anchorable at either free end upon the common anchor, said free end having an opening, and an auxiliary shoe movable into engagement with the drum and having a part extending axially through said opening, said part adapted to engage an edge of said opening to move the main shoe into engagement with the drum.

26. A brake comprising a revoluble drum, a common anchor, a main one piece shoe anchorable at either free end upon the common anchor, and having separable ends movable into engagement with said drum, said ends having complementary openings, and an auxiliary shoe movable into engagement with the drum and having a part extending into said openings, said part adapted to engage the edge of one of said openings depending upon the direction of rotation of the drum to move the main shoe into engagement with the drum.

JOHN SNEED.